(12) United States Patent
Oshima

(10) Patent No.: US 6,846,541 B1
(45) Date of Patent: Jan. 25, 2005

(54) OPTICAL DISC AND PROCESS FOR THE PRODUCTION OF LAVEL THEREFOR

(75) Inventor: Kenji Oshima, Fukuoka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 10/668,251

(22) Filed: Sep. 24, 2003

(30) Foreign Application Priority Data

Sep. 24, 2002 (JP) .................................... 2002-276996

(51) Int. Cl.⁷ ............................................... B32B 3/02
(52) U.S. Cl. ................. 428/64.1; 428/64.4; 430/270.11
(58) Field of Search .............................. 428/64.1, 64.4, 428/913; 430/270.11, 495.1, 945

(56) References Cited

U.S. PATENT DOCUMENTS

| 4,877,678 | A | * | 10/1989 | Hasegawa et al. | ........ 428/32.25 |
| 5,573,831 | A | * | 11/1996 | Suzuki et al. | ............... 428/64.1 |
| 5,972,457 | A | * | 10/1999 | Matsuishi et al. | ......... 428/64.1 |
| 6,000,793 | A | | 12/1999 | Inamoto | |
| 6,084,620 | A | | 7/2000 | Morikawa et al. | |
| 6,161,928 | A | | 12/2000 | Morikawa et al. | |
| 6,277,461 | B1 | * | 8/2001 | Naganuma et al. | ......... 428/64.1 |
| 6,329,035 | B1 | * | 12/2001 | Iwasaki et al. | ............ 428/64.1 |
| 6,464,348 | B1 | | 10/2002 | Kasperchik et al. | |
| 2002/0061382 | A1 | * | 5/2002 | Strobel | ....................... 428/64.4 |

FOREIGN PATENT DOCUMENTS

| JP | 8-102098 | 8/1996 |
| JP | 9-330535 | 12/1997 |
| JP | 10-188345 | 7/1998 |
| JP | 2002-144551 | 5/2002 |
| JP | 2002-264304 | 9/2002 |
| JP | 2003-53942 | 2/2003 |
| JP | 2003-80819 | 3/2003 |

* cited by examiner

Primary Examiner—Elizabeth Mulvaney
(74) Attorney, Agent, or Firm—Wenderoth, Lind & Ponack, L.L.P.

(57) ABSTRACT

To provide an optical disc having a label printing surface capable of forming a high quality and high fastness image by an ink jet recording process and a process for the production of a label An ink-receiving layer 5 is provided on an optical disc substrate 1 on the label printing side thereof. A protective layer 7 made of a transparent, non-aqueous solvent soluble resin capable of forming at ordinary temperature a water-resistant plastic film is formed on the label image-printed surface developed by an ink jet printer.

9 Claims, 2 Drawing Sheets

OPTICAL DISC AND PROCESS FOR THE PRODUCTION OF LAVEL THEREFOR

CROSS REFERENCE TO RELATED APPLICATION

This application is based upon and claims the benefit of priority of Japanese Patent Application No 2002-276996 filed on Sep. 24, 2002, the contents of which are incorporated herein by reference in its entirety.

BACKGROUND OF THE INVENTION

1. Field of the Invention

The present invention relates to an optical disc capable of printing on the label surface by an ink jet printing process such as compact disc (CD) and digital video disc (DVD) and a process for the production of a label surface therefor.

2. Description of the Related Art

Heretofore, in a machine for mass-producing optical discs such as read-only CD and DVD, it has been usual that a label having the description of title of data stored in the discs, name of manufacturer, name of distributor, logo mark and other images is printed on the surface of the discs using a dedicated screen printing machine or offset printing machine.

FIG. 2 illustrates a flow chart of a step of producing DVD. In the following description, where the same constituents are used, the same reference numerals are used even in different drawings. In FIG. 2, a laminating disc 9 produced by injection molding using a forming device 8 is subjected to vacuum metallizing with aluminum on the surface thereof in a vacuum evaporating device 10 to form a laser beam reflective layer. Two sheets of disc 9 having two different data layers are then laminated with each other by spin coat adhesion or like method in a laminating device 11. The laminate thus obtained is then ultraviolet-cured. A base layer ink is screen-printed or otherwise spread over the laminate on the side thereof opposite the reflective surface, and then ultraviolet-cured using a base layer printing device 12. Using a label printing device 13, a label is color-printed on the laminate by screen printing process or offset printing process, and then ultraviolet-cured to produce DVD 14. However, since printing by these printing machines requires much time and expenses to produce printing plate and adjust colors, ink jet printers are used to record images in the case of small scale production of media such as printable CD-R and DVD-R and rewritable CD-RW and DVD-RW. In the case where ink jet printers are used to record images, it is necessary that an ink-receiving layer have been previously formed on the surface of the optical disc because the surface of the optical disc such as CD and DVD has no ink absorptivity. An ink is ejected onto the ink-receiving layer through an ink jet head to form an image thereon. Thus, an optical disc allowing printing by an ink jet printer is disclosed. (See, e.g., JP-A-8-102098 (FIG. 3, page 2), JP-A-10-188345 (FIG. 3, page 2))

FIG. 3 is a sectional view of an optical disc adapted for ink jet printing. In FIG. 3, the reference numeral 1 indicates an optical disc, the reference numeral 2 indicates an optical disc substrate having a data recording surface formed thereon, the reference numeral 3 indicates a clamp hole for setting the optical disc on a drive or player, the reference numeral 4 indicates a white base layer, the reference numeral 5 indicates an ink-receiving layer, and the reference numeral 6 indicates a label image printed on the ink-receiving layer by an inkjet printer. The optical disc substrate 2 is normally in the form of disc having an outer diameter of 120 mm, an inner diameter, i.e., clamp hole 3 diameter of 15 mm and a thickness of 1.2 mm and comprises a transparent plastic such as polycarbonate as a base material. The white base layer 4 is formed when it is desired to block the color of the recording layer or metal deposit in the optical disc substrate in order to make it possible to perform natural color printing. The white base layer 4 is obtained by spreading a white ultraviolet-curing ink over the substrate by a screen printing process or the like, and then curing the ink. The ink-receiving layer 5 is adapted to absorb and retain the ink jet recording ink, allowing image formation, and is normally formed by spreading an ink-like composition comprising a hydrophilic resin, a photo-polymerizable monomer, a photopolymerization initiator, a filler and other additives incorporated therein in admixture by a screen printing process or the like, and the curing the coat. In this arrangement, printing using an ink jet printer can be conducted.

However, since the optical disc having the aforementioned arrangement has moisture absorption in the ink-receiving layer and an insufficient ink fixability, the resulting image cannot be sometimes provided with a sufficient water resistance. Further, since the ink-receiving layer has a low strength, the resulting image is subject to exfoliation or damage, occasionally making it impossible to provide the label-printed surface with a sufficient durability. In order to solve these problems, a method for the production of a label for disc has been disclosed which comprises forming an overcoat layer (protective layer) of ultraviolet-curing resin on the printing surface to enhance the durability of the label-printed surface. (See, e.g., JP-A-9-330535 (FIG. 4, page 3)). FIG. 4 is a sectional view of an optical disc adapted for ink jet printing having a related art protective layer. In FIG. 4, the reference numeral 1 indicates an optical disc, the reference numeral 2 indicates an optical disc substrate having a data recording surface formed thereon, the reference numeral 3 indicates a clamp hole for setting the optical disc on a drive or player, the reference numeral 4 indicates a white base layer, the reference numeral 5 indicates an ink-receiving layer, the reference numeral 6 indicates a label image printed on the ink-receiving layer by an ink jet printer, and the reference numeral 15 indicates a protective layer formed by an ultraviolet-curing resin.

The protection of the ink jet-receiving layer and the printed image by such an arrangement makes it possible to prevent the damage or exfoliation of the printing surface.

In the aforementioned method for forming a protective layer for printing surface by an ultraviolet-curing resin, it is necessary that the ultraviolet-curing resin spread over the surface of the disc substrate on which a label image has been formed be irradiated on the surface thereof with a high intensity ultraviolet ray to cure. Color ink jet recording inks preferably comprise organic dyes or pigments incorporated therein as colorants. In particular, organic dyes normally exhibit a higher color developability and saturation and a better adaptability to ink-receiving layer and thus can form a higher quality image than organic pigments. However, these organic coloring matters, particularly organic dyes, can be easily affected by ultraviolet rays and most of them undergo molecular modification and discoloration when irradiated with ultraviolet rays. Accordingly, the related art technique for forming protective layer is disadvantageous in that when irradiated with ultraviolet rays for curing the ultraviolet-curing resin spread over the ink jet-printed surface, the organic coloring matters in the ink jet-printed surface undergo modification and discoloration that cause image deterioration.

SUMMARY OF THE INVENTION

It is therefore an aim of the invention to provide an optical disc having a label printing surface capable of forming a high quality and high fastness image by an ink jet recording process and a process for the production of a label therefor.

The optical disc of the invention comprises an ink-receiving layer provided on a disc substrate on the label printing surface thereof and a protective layer formed on the surface thereof on which a label image is printed by an ink jet printer, which protective layer is made of a transparent, non-aqueous solvent soluble resin capable of forming at ordinary temperature a water-resistant plastic film.

In accordance with the invention, an optical disc having a label printing surface capable of forming a high quality and high fastness image by an ink jet recording process and a process for the production of a label therefor can be realized. The invention described in claim 1 is an optical disc comprising an ink-receiving layer provided on a disc substrate on the label printing side thereof which has a label image printed thereon by an ink jet printing process, wherein there is formed on the label image printing surface thereof a protective layer made of a transparent, non-aqueous solvent soluble resin capable of forming at ordinary temperature a water-resistant plastic film. The optical disc of the invention acts to enhance the water resistance of the printing surface and prevent the damage and exfoliation of the printing surface without modifying or discoloring the organic coloring matters in the ink jet-printed surface. The optical disc of the invention also acts to prevent the running of the aqueous ink jet recording ink in the printing surface during the formation of the protective layer.

The invention described in claim 2 is the optical disc defined in claim 1 wherein the non-aqueous solvent is an aliphatic hydrocarbon-based solvent. The optical disc of claim 2 acts to realize the use of a non-aqueous solvent which causes no damage on the disc substrate and the ink jet-receiving layer and exhibits a high safety to environment and human body.

The invention described in claim 3 is the optical disc defined in claim 1 wherein the label image-printed surface has the label image printed thereon with an ink jet recording ink comprising an organic dye as a colorant. The optical disc defined in claim 3 acts to form an image having a high color development and saturation.

The invention described in claim 4 is a process for printing a label on an optical disc which comprises providing an ink-receiving layer on a disc substrate on the label printing side thereof and then printing a label image on the ink-receiving layer by an ink jet recording process wherein process for printing a label on an optical disc is a process for the production of a label for optical disc which comprises printing a label image on the ink-receiving layer, spreading over the printing surface thereof a solution obtained by dissolving a transparent resin capable of forming at ordinary temperature a water-resistant plastic film in a non-aqueous solvent, and then evaporating the non-aqueous solvent to dryness to form a protective layer. The process defined in claim 4 acts to allow the production of a label capable of enhancing the water resistance of the printing surface and preventing the damage and exfoliation of the printing surface without modifying or discoloring the organic coloring matter in the inkjet-printed surface. The process defined in claim 4 acts to allow the production of a label capable of preventing the running of the aqueous ink jet recording ink in the printing surface during the formation of the protective layer.

The invention described in claim 5 is the process for the production of a label for optical disc defined in claim 4 wherein as the non-aqueous solvent there is used an aliphatic hydrocarbon-based solvent. The process defined in claim 5 acts to allow the production of a label comprising a non-aqueous solvent which causes no damage on the disc substrate and the ink-receiving layer and exhibits a high safety to environment and human body.

The invention described in claim 6 is the process for the production of a label for optical disc as defined in claim 4 or 5 wherein the step of spreading the solution over the printing surface comprises a spin coating process. The process defined in claim 6 acts to execute the processing simply in a large amount.

The invention described in claim 7 is the process for the production of a label for optical disc as defined in claim 4 or 5 wherein the step of spreading the solution over the printing surface comprises a screen printing process. The process defined in claim 7 acts to waste little solvent.

DESCRIPTION OF THE PREFERRED OF THE EMBODIMENTS

Figure 1:
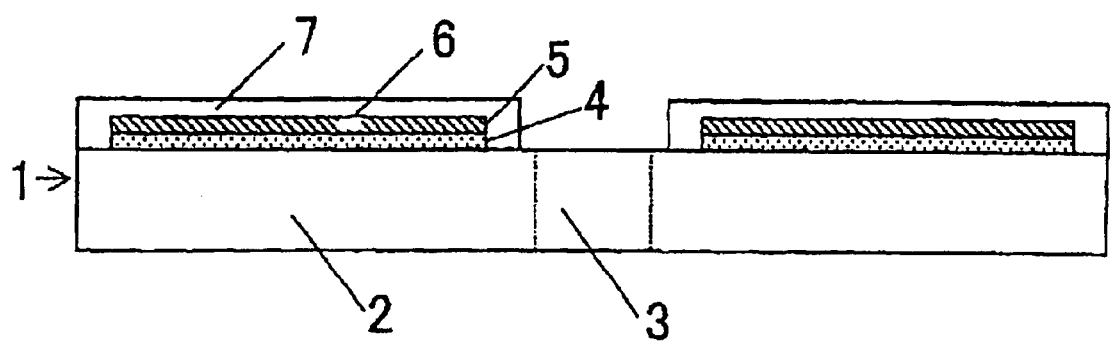
FIG. 1 is a sectional view of an optical disc of the invention.

FIG. 1 is a sectional view of an optical disc of the invention. In FIG. 1, the reference numeral 1 indicates an optical disc, the reference numeral 2 is an optical disc substrate having a data recording surface formed thereon, the reference numeral 3 is a clamp hole for setting the optical disc on a drive or player, the reference numeral 4 indicates a white base layer, the reference numeral 5 indicates an ink-receiving layer, the reference numeral 6 indicates a label image printed on the ink-receiving layer by an ink jet printer, and the reference numeral 7 indicates a transparent protective layer which is a characteristic of the invention.

The white base layer 4 is formed when it is desired to mask the color of the recording layer or metal deposit in the optical disc substrate, making it possible to perform natural color printing. The white base layer 4 is obtained by spreading a white ultraviolet-curing ink by screen printing process or the like, and then curing the coat. The thickness of the ink layer thus cured is normally about 10 $\mu$M. As such a white ultraviolet-curing ink there may be used any of various products commercially available as white inks for CD printing or DVD printing. Examples of these products include Daicure SSD Series (trade name) (produced by DAINIPPON INK AND CHEMICALS, INCORPORATED), Seridisk URA05 and URA025 (trade name) (produced by TOYO INK MFG. CO., LTD.), and Raycure VID F-27 (trade name) (produced by JUJO CHEMICAL CO., LTD.).

The ink-receiving layer 5 is adapted to absorb and retain the ink jet recording ink, allowing the formation of an image. The ink-receiving layer 5 is generally obtained by spreading an ink-like composition comprising a hydrophilic resin, a photo-polymerizable monomer, a photo polymerization initiator, a filler and other additives incorporated therein in admixture by a screen printing process or the like, and the curing the coat. The thickness of the ink-receiving layer 5 thus cured is generally from about 10 $\mu$m to 20 $\mu$m. Such an ink-receiving layer composition and its forming method are disclosed in, e.g., JP-A-10-188345, which is cited in the paragraph of related art. Products are commercially available as ultraviolet-curing compositions such as Raycure RCD Clear (trade name), produced by JUJO CHEMICAL CO., LTD. Such a product can be spread by a screen printing process, and then ultraviolet-cured to form an ink-receiving layer.

As the ink jet recording ink for forming the label image 6 there is preferably used an aqueous ink comprising an organic dye or pigment as a colorant, a wetting agent such as polyvalent alcohol, a penetrating agent such as glycol ether, a surface active agent, a pH adjustor, a lower alcohol and other additives. In particular, an aqueous ink comprising an organic dye as a colorant exhibits so excellent color developability and color reproducibility as to form a high quality image. However, an organic dye is easily affected by ultraviolet rays and thus undergoes molecular modification and decoloration when irradiated with ultraviolet rays. Accordingly, the related art technique for forming a protective layer from a ultraviolet-curing resin is disadvantageous in that the organic dye in the inkjet-printed surface undergoes modification and decoloration that causes image deterioration. However, the invention has no such problems and thus can form a high quality image.

The protective layer 7 is another characteristic of the invention. The protective layer 7 is produced by spreading a solution having a transparent, non aqueous solvent soluble resin capable of forming at ordinary temperature a water-resistant plastic film by a screen printing process or spin coating process over the surface of a label image printed by an ink jet printer, and then evaporating the non-aqueous solvent to dryness. The formation of such a protective layer makes it possible to solve the aforementioned problems. Further, the use of the non-aqueous solvent makes it possible to prevent the aqueous ink jet recording ink from running on the printing surface during the spreading of the solvent.

Firstly, the materials for forming the protective layer 7 will be described hereinafter.

The non-aqueous solvent of the invention is required to exhibit a proper range of evaporation rate taking into account the spreadability and dryability of the resin solution, have a sufficient dissolving power when combined with the transparent resin described later, cause no damage on the disc substrate and ink jet-receiving layer and show a low viscosity taking into account the fluidity and spreadability of the resin solution thus produced. Various known non-aqueous solvents may be used so far as these requirements can be satisfied. In addition, aliphatic hydrocarbon-based solvents such as normal paraffins, isoparaffins and naphthenes are preferably used because they have a high safety to environment and human body and give little odor. Particularly preferred examples of the aliphatic hydrocarbon-based solvents include high purity aliphatic hydrocarbon-based solvents. Examples of commercially available high purity aliphatic hydrocarbon-based solvents include ISO-PAR (trade name) Series, NOPAR (trade name) Series and EXXOL Series (tradename) (produced by Exxon Chemical Japan), IP Solvents 1016, 1620 and 2028 (trade name) (produced by Idemitsu Petrochemical Co., Ltd.), Isosol (trade name) Series and Normal Paraffin (tradename) Series (produced by Nippon Petrochemicals Co., Ltd.), and MARUKASOL R (trade name) (produced by Maruzen Petrochemical). These products exhibit a viscosity of not greater than 3 mPa~S at 25° C., a low reactivity, a good stability, a low toxicity and a high safety and gives little odor. These hydrocarbon-based solvents may be used singly or in admixture. These hydrocarbon-based solvents may also be used in admixture with solvents other than hydrocarbon-based solvents compatible with hydrocarbon-based solvents so far as the aforementioned requirements are satisfied.

The transparent, non-aqueous solvent soluble resin of the invention capable of forming at ordinary temperature a water-resistant plastic film will be described below. The term "ordinary temperature" as used herein is normally meant to indicate the ambient temperature at which the optical disc is used, that is, from about 0° C. to 40° C. Accordingly, the term "ordinary temperature" as used herein is defined to be in the range of from about 0° C. to 40° C. The aforementioned resin is required to be soluble in the aforementioned non-aqueous solvent at ordinary temperature. When spread over the surface of the layer printed by an ink jet printer in the form of solution in the non-aqueous solvent, the resin is required to be concentrated in the solution with the evaporation of the aforementioned solvent and have an increasing intermolecular force that makes it possible to form a plastic film. In this arrangement, the ink jet-receiving layer and the printed image can be protected, making it possible to prevent the damage and exfoliation of the printing surface and secure water resistance. Thus, the resin is required to have chemically structural constituents similar to that of the aforementioned non-aqueous solvent or substantially the same polarity as that of the aforementioned non-aqueous solvent in order to secure a sufficient solubility in the aforementioned non-aqueous solvent and occur in the form of solid plastic at ordinary temperature when given in a simple body, that is, to have a glass transition temperature of not lower than about 40° C., which is higher than ordinary temperature. The kind of the resin to be used herein is not specifically limited so far as these requirements are satisfied. Various natural resins or synthetic resins can be used. Examples of these resins include polyolefin-based resins, saturated hydrocarbon resins, polyvinyl-based resins, polyester-based resins, acryl-based resins, alkyd resins, and rosin-based resins. In particular, as a synthetic resin product which exhibits a glass transition temperature of not lower than about 40° C., is soluble in the aforementioned aliphatic hydrocarbon-based solvent that is particularly preferred as the solvent to be used and can form a plastic film there can be selected from the group of products such as PARALOID Series (tradename) (produced by Rohm and Haas Company), Prioway (trade name) Series (produced by Eliochem Inc.), Acridic (trade name) Series (produced by DAINIPPON INK AND CHEMICALS, INCORPORATED), Arcon (tradename) Series (produced by Arakawa Chemical Industries, Ltd.) and Bekkosol (trade name) Series (produced by DAINIPPON INK AND CHEMICALS, INCORPORATED).

In order to produce the protective layer-forming coating solution from the aforementioned materials, any of various known methods may be employed to dissolve the resin uniformly in a non-aqueous solvent. In this case, the proportion of the resin in the total amount of the solution is preferably from 5% to 60% by weight, more preferably from 10% to 50% by weight. When the concentration of the resin falls below 5% by weight, the concentration of solid content is too low to form a layer having a sufficient thickness. Further, a tendency is given that physical properties suitable particularly for screen printing can be difficultly obtained to disadvantage. On the contrary, when the concentration of the resin exceeds 60% by weight, the resulting ink exhibits too high a viscosity to obtain physical properties suitable particularly for spin coat printing to disadvantage. The resin solution thus produced is then spread over the printing surface by a screen printing process or spin coating process. The non-aqueous solvent is then evaporated to dryness to form a protective layer. For the evaporation of the non-aqueous solvent to dryness, a heating step may be properly effected taking into account productivity. In this case, however, it is necessary that the heating temperature be lower than about 80° C. to prevent the optical disc from undergoing deformation such as warping due to heating. By thus adjusting the mixing ratio of components in the solution and the physical properties, spreadability and drying conditions of the solution, a protective layer having a thickness of from 1 $\mu$m to 30 $\mu$m, preferably from 5 $\mu$m to 20 $\mu$m is formed. When the thickness of the protective layer falls below 1 $\mu$m a sufficient hardness can be difficultly obtained. On the contrary, when the thickness of the protective layer exceeds 30 $\mu$m, a uniform layer can be difficultly produced.

Further, the productivity is lowered to disadvantage.

The invention will be further described in the following examples.

(First Embodiment)

Figure 2:
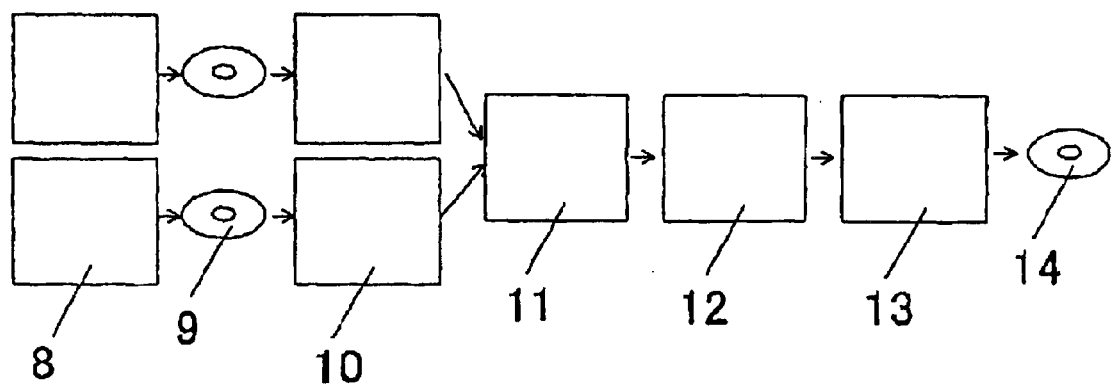
FIG. 2 is a flow chart of a step of producing DVD.
Figure 3:
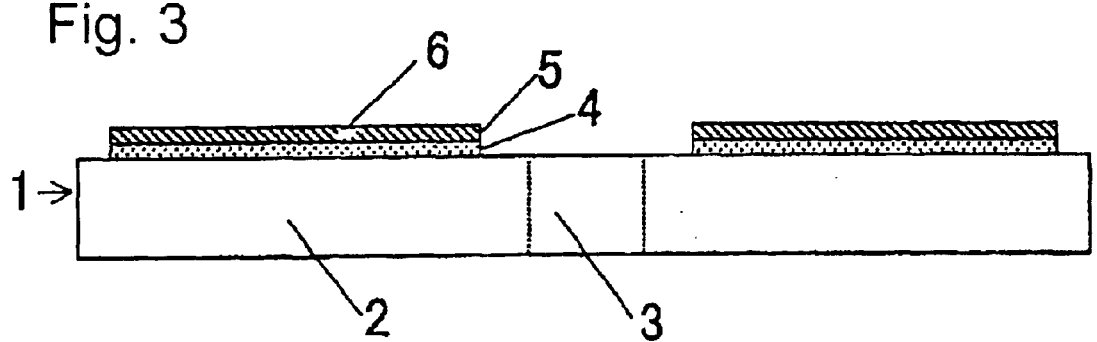
FIG. 3 is a sectional view of an optical disc adapted for ink jet printing.
Figure 4:
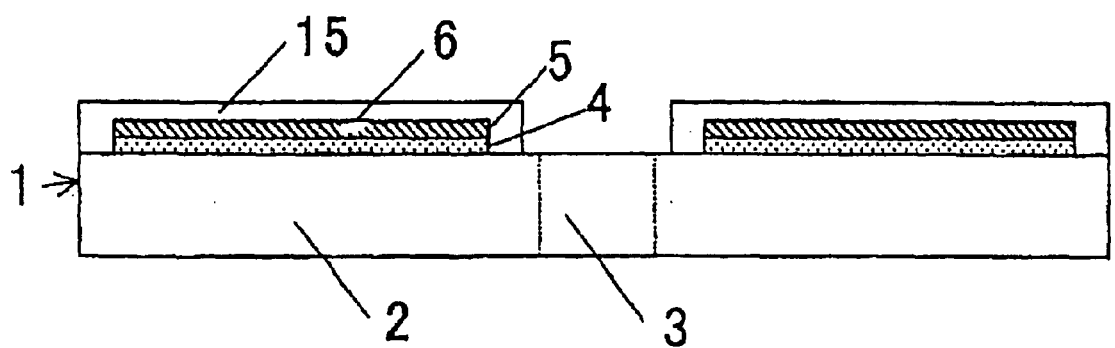
FIG. 4 is a sectional view of an optical disc adapted for ink jet printing having a related art protective layer.

An optical disc with an outer diameter of 120 mm and a thickness of 1.2 mm having no label surface formed thereon was produced from a polycarbonate as a base material according to the same procedure as shown in the former half of the step in FIG. 2 with reference to the related art. The optical disc was coated with Seridisk URA05 (trade name), which is an ultraviolet-curing white ink produced by TOYO INK MFG. CO., LTD., on the side thereof opposite the signal read surface using a 300-mesh screen, and then irradiated with ultraviolet ray from a 120 W/cm metal halide lamp to form a white base layer to a thickness of about 10 $\mu$m. Raycure RCD Clear (trade name), which is an ultra violet-curing ink-receiving layer composition produced by JUJO CHEMICAL CO., LTD., was then screen-printed on the white base layer through a 300-mesh screen. The coated material was then irradiated with ultraviolet ray from a 120 W/cm metal halide lamp to form an ink-receiving layer to a thickness of about 12 $\mu$m. Subsequently, using a piezoelectric ink jet head, various monochromatic color patches and a color image were printed on the ink-receiving layer with four color aqueous inks (black, cyan, magenta, yellow) comprising organic dyes as colorants. Subsequently, a transparent solution having Prioway Ultra 200 (trade name), which is a transparent acrylic copolymer resin produced by Eliochem Inc., dissolved in ISOPAR G (trade name), which is a high purity aliphatic hydrocarbon-based solvent produced by Exxon Chemical Japan, in an amount of 20% by weight was produced. The transparent solution thus produced was spread over the surface of the disc on which a color image had thus been formed, subjected to spin coating at 2,000 rpm, and then dried at a temperature of 70° C. for 10 minutes to form a transparent protective layer for plastic film to a thickness of about The label surface thus produced was then measured for optical density (OD) and saturation (c*) of the various monochromatic color patches. For the measurement of optical density, a Type Macbeth Series 1200 densitometer was used. For the measurement of saturation, a Type CR-300 chromameter (produced by MINOLTA CO., LTD.) was used. The label surface was then strongly rubbed with a paper wiper thoroughly impregnated with distilled water to examine the water resistance and fretting resistance of the image. The results are set forth in Table 1. As can be confirmed by the results, the disc label surface produced according to the present example exhibits a high water resistance and fastness while maintaining a high optical density and saturation as compared with the comparative examples described later.

(Second Embodiment)

The same materials and procedure as used in Example 1 were used to form a white base layer and an ink-receiving layer. Subsequently, using a piezoelectric ink jet head, various monochromatic color patches and a color image were printed on the ink-receiving layer in the same manner as in Example 1. Subsequently, Acridic A (trade name), which is an acrylic resin solution produced by DAINIPPON INK AND CHEMICALS, INCORPORATED, was screen-printed on the surface of the disc on which a color image had thus been formed using a 300-mesh screen, and then dried at a temperature of 70° C. for 10 minutes to form a transparent protective layer for plastic film to a thickness of about 10 $\mu$m. Acridic A used was obtained by dissolving an acrylic resin in a high purity aliphatic hydrocarbon-based solvent as a solvent.

The label surface thus produced was then measured for optical density (OD) and saturation (c*) of the various monochromatic color patches in the same manner as in Example 1. The label surface was then strongly rubbed with a paper wiper thoroughly impregnated with distilled water to examine the water resistance and fretting resistance of the image. The results are set forth in Table 1. As can be confirmed by the results, the disc label surface produced according to the present example exhibits a high water resistance and fastness while maintaining a high optical density and saturation as compared with the comparative examples described later.

COMPARATIVE EXAMPLE 1

The same materials and procedure as used in Example 1 were used to form a white base layer and an ink-receiving layer. Subsequently, using a piezoelectric ink jet head, various monochromatic color patches and a color image were printed on the ink-receiving layer in the same manner as in Example 1.

The label surface free of protective layer thus produced was then measured for optical density (OD) and saturation (c*) of the various monochromatic color patches in the same manner as in Example 1. The label surface was then strongly rubbed with a paper wiper thoroughly impregnated with distilled water to examine the water resistance and fretting resistance of the image.

TABLE 1

| | Optical density (OD) | | | Saturation (C*) | | | Water resistance/ |
|---|---|---|---|---|---|---|---|
| | Cyan | Magenta | Yellow | Cyan | Magenta | Yellow | fretting resistance |
| Example 1 | 0.59 | 0.68 | 0.89 | 30 | 42 | 49 | No image disturbance, no exfoliation |
| Example 2 | 0.58 | 0.67 | 0.89 | 31 | 43 | 49 | No image disturbance, no exfoliation |
| Comparative Example 1 | 0.55 | 0.64 | 0.82 | 30 | 43 | 50 | Image remarkably exfoliated |
| Comparative Example 2 | 0.53 | 0.51 | 0.60 | 23 | 26 | 27 | No image disturbance, no exfoliation |

The results are set forth in Table 1. As can be confirmed by the results, the disc label surface free of protective layer produced according to the present comparative example exhibits a high optical density and saturation but exhibits an extremely low image water resistance and fastness.

COMPARATIVE EXAMPLE 2

The same materials and procedure as used in Example 1 were used to form a white base layer and an ink-receiving layer. Subsequently, using a piezoelectric ink jet head, various monochromatic color patches and a color image were printed on the ink-receiving layer in the same manner as in Example 1. Subsequently, UV Clear (trade name), which is an ultraviolet-curing clear ink produced by Teikoku Printing Inks Mfg. Co., Ltd., was screen-printed on the disc on using a 300-mesh screen, and then irradiated with ultra violet ray from a 120 W/cm metal halide lamp to form a transparent protective layer for plastic film to a thickness of about 10 $\mu$m.

The label surface thus produced was then measured for optical density (OD) and saturation (c*) of the various monochromatic color patches in the same manner as in Example 1. The label surface was then strongly rubbed with a paper wiper thoroughly impregnated with distilled water to examine the water resistance and fretting resistance of the image. The results are set forth in Table 1. As can be confirmed by the results, the disc label surface having an ultraviolet-curing protective layer formed thereon according to the present comparative example exhibits a high image water resistance and fastness but exhibits a low optical density and saturation as compared with the aforementioned examples. This is because the irradiation with ultraviolet ray during the formation of the protective layer causes the modification and discoloration of the dyes in the ink jet recording inks.

As mentioned above, the invention allows the formation of a plastic film for protecting the printing surface developed by an ink jet printer without irradiating with ultraviolet ray, making it possible to enhance the water resistance of the printed image and prevent the damage and exfoliation of the printed image without causing the discoloration and saturation drop of the printing surface. Accordingly, an optical disc having a label printing surface capable of forming a high quality and high fastness image by an ink jet recording process can be realized.

What is claimed is:

1. An optical disc comprising an ink-receiving layer provided on a disc substrate on the label printing side thereof which has a label image printed thereon by an ink jet printing process, wherein a protective layer made of a transparent, non-aqueous solvent soluble resin capable of forming at ordinary temperature a water-resistant plastic film, is formed on the label image printing surface.

2. The optical disc as defined in claim 1, wherein the non-aqueous solvent is an aliphatic hydrocarbon-based solvent.

3. The optical disc as defined in claim 1, wherein the label image-printed surface has the label image printed thereon with an ink jet recording ink comprising an organic dye as a colorant.

4. In a process for printing a label on an optical disc which comprises providing an ink-receiving layer on a disc substrate on the label printing side thereof and then printing a label image on the ink-receiving layer by an ink jet recording process, a process for the production of a label for optical disc which comprises:

printing a label image on the ink-receiving layer, spreading over the printing surface thereof a solution obtained by dissolving a transparent resin capable of forming at ordinary temperature a water-resistant plastic film in a non-aqueous solvent, and evaporating the non-aqueous solvent to dryness to form a protective layer.

5. The process for the production of a label for optical disc as defined in claim 4, wherein an aliphatic hydrocarbon-based solvent is used as the non-aqueous solvent.

6. The process for the production of a label for optical disc as defined in claim 4, wherein the step of spreading the solution over the printing surface comprises a spin coating process.

7. The process for the production of a label for optical disc as defined in claim 5, wherein the step of spreading the solution over the printing surface comprises a spin coating process.

8. The process for the production of a label for optical disc as defined in claim 4, wherein the step of spreading the solution over the printing surface comprises a screen printing process.

9. The process for the production of a label for optical disc as defined in claim 5, wherein the step of spreading the solution over the printing surface comprises a screen printing process.

* * * * *